Sept. 20, 1960 J. E. MILLER ET AL 2,953,744
CONTACT IDENTIFYING DEVICE
Filed Sept. 5, 1958 4 Sheets-Sheet 1

INVENTORS
JAMES E. MILLER
WILLIAM A. BIRD
BY
*Bauer and Seymour*
ATTORNEYS

Sept. 20, 1960     J. E. MILLER ET AL     2,953,744
CONTACT IDENTIFYING DEVICE
Filed Sept. 5, 1958     4 Sheets-Sheet 3
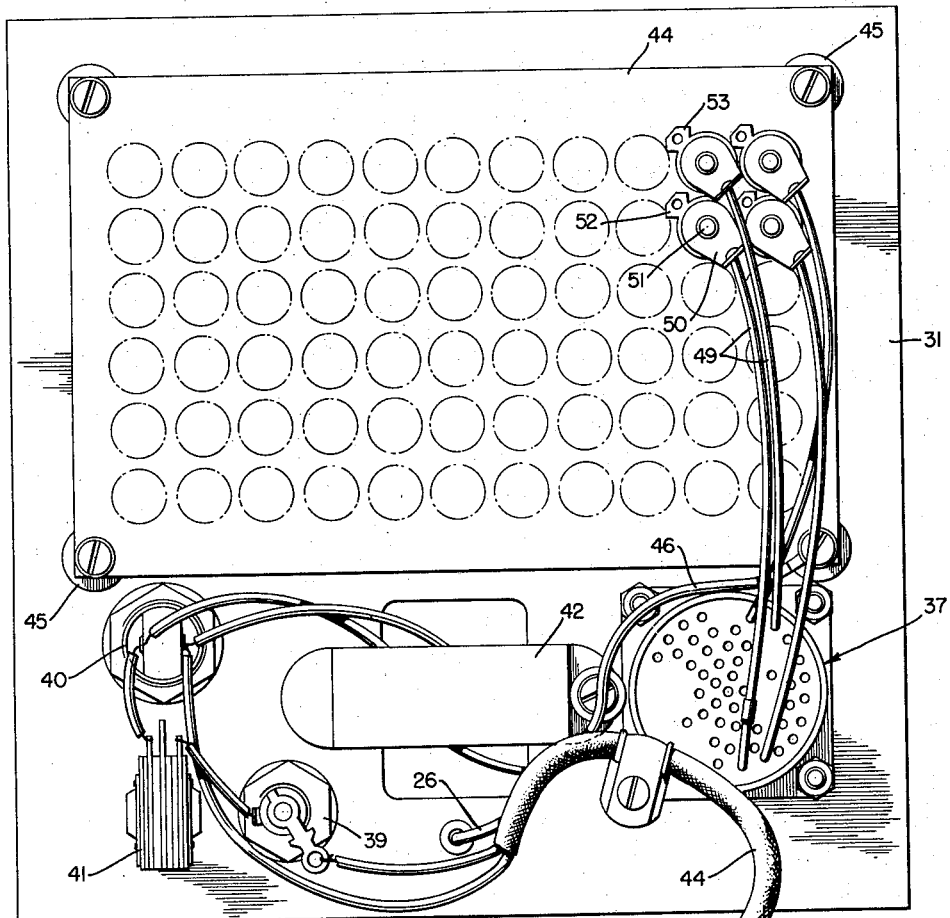
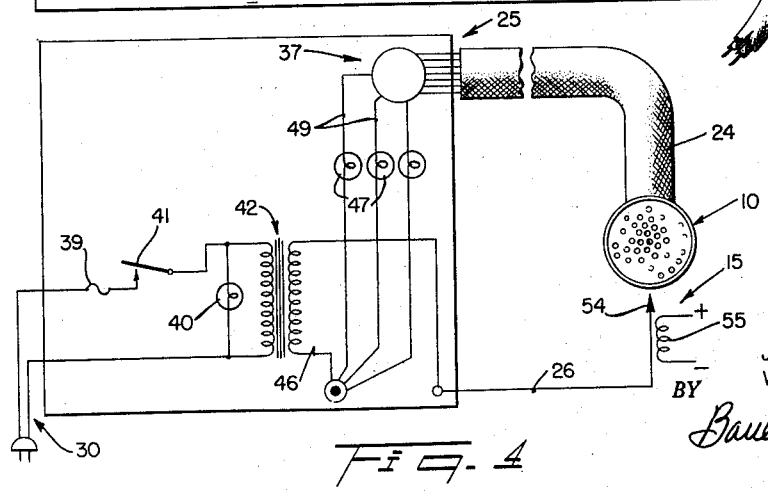
INVENTORS
JAMES E. MILLER
WILLIAM A. BIRD
BY
Bauer and Seymour
ATTORNEYS

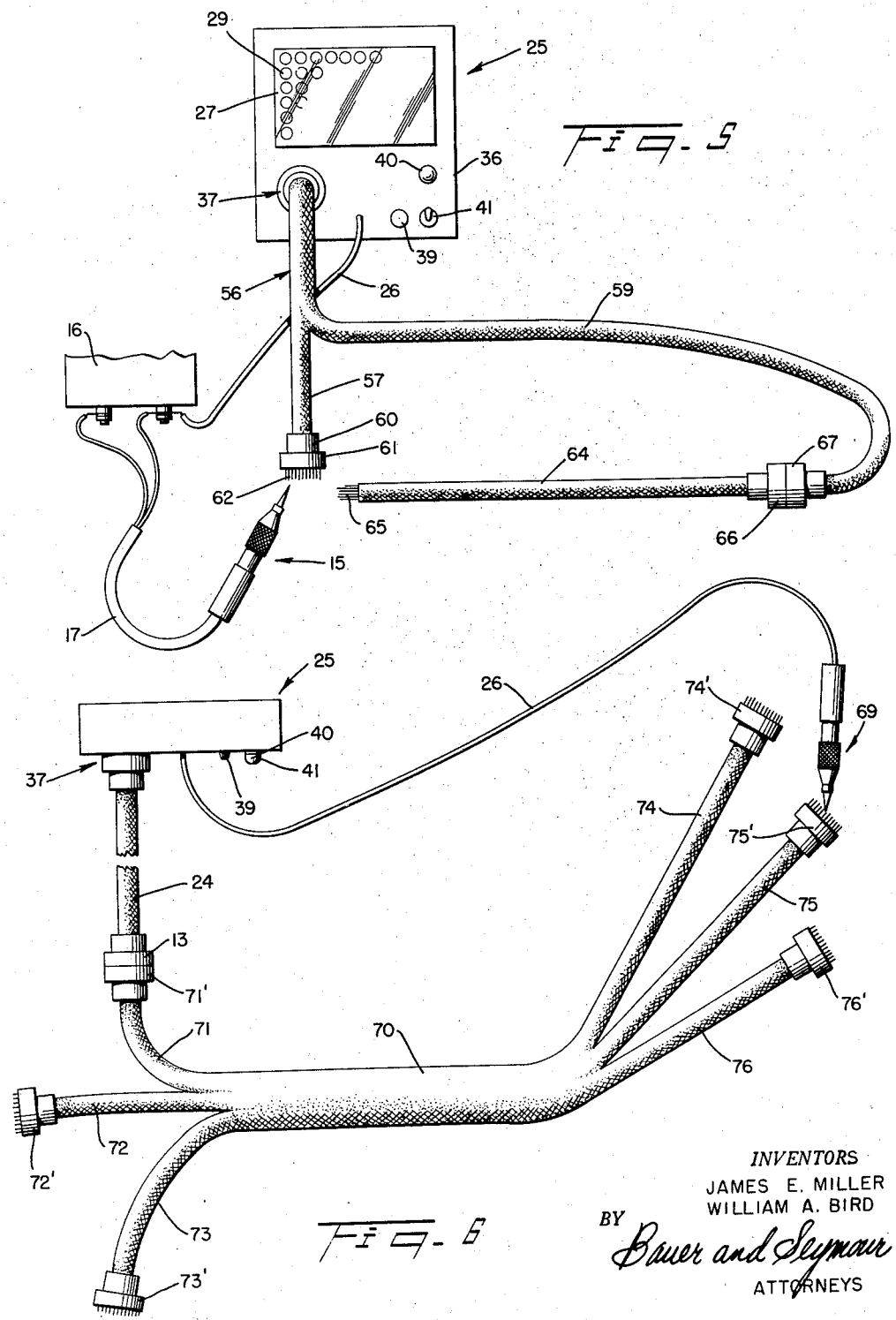

United States Patent Office 2,953,744
Patented Sept. 20, 1960

2,953,744
CONTACT IDENTIFYING DEVICE

James E. Miller, Sidney, and William A. Bird, Bainbridge, N.Y., assignors to The Bendix Corporation, a corporation of Delaware Filed Sept. 5, 1958, Ser. No. 759,218

10 Claims. (Cl. 324—66)

This invention relates to new and useful improvements in a device for identifying a plurality of conductors. The device is particularly useful in identifying the contacts of a multiple contact connector as for soldering a multi-wire cable thereto, and in determining the continuity of circuits incorporating multiple wire cables and connectors therefor.

The invention has among its objects the provision of a novel, simple device for identifying the wires of a multi-wire cable.

A further object of the invention lies in the provision of a device for identifying the closely spaced contacts of a multi-wire connector.

Yet another object resides in the provision of a novel combination of soldering tool and conductor-identifying device whereby the conductor may be identified and the identifying signal persists during the soldering of the identified conductor.

Yet another object lies in the provision of a device of the character indicated wherein the conductor-identifying signal is given visually.

A still further object lies in the provision of a novel identifier wherein the visual signal device corresponding to each conductor is located in a predetermined position relative to the other signal devices whereby its identity may be readily ascertained.

Yet another object lies in the provision of a conductor-identifier having visual signal devices, the identifier being so constructed as to indicate when the wrong conductor or contact is engaged by a probe, or when two conductors or contacts are engaged simultaneously by such probe.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views.

Fig. 3 is a fragmentary view in rear elevation of the identifier;

Fig. 4 is a somewhat schematic circuit diagram of the identifier;

Fig. 5 is a schematic view showing an alternative embodiment of the contact-identifying and soldering system of the invention, such embodiment being useful in attaching the wires at a second end of a multi-wire cable to a connector part; and Fig. 6 is a somewhat schematic view indicating the use of the contact-identifier of the invention in determining the circuit continuity of a multiple-branch harness.

Multi-wire cables which are used, for example, in the control of aircraft and missiles may in some instances contain as many as sixty one or more separate wires. To permit the ready assembly of such cables in control circuits it is necessary to provide separable connectors between sections of the cables. Because it is vitally necessary to maintain the bulk and weight of such connectors at a minimum the various contacts of the connector parts are necessarily located close together. The chance of error in connecting the wires of the cables to the connector parts is great, and once an error has been made it is difficult to trace and rectify it.

The contact or conductor-identifying device of the present invention allows for ready identification of any one of the conductors or contacts of a multi-contact device connected thereto. In a preferred embodiment not only are the contacts identified but they are soldered while the unique contact-identifying signal therefor persists. Thus the chance of error in connecting multi-wire cables to connector parts when employing the device of the present invention is virtually eliminated. Other uses to which the device of the invention may advantageously be put have been indicated above among the objects of the invention and will be discussed in detail hereinafter.

Figure 1:
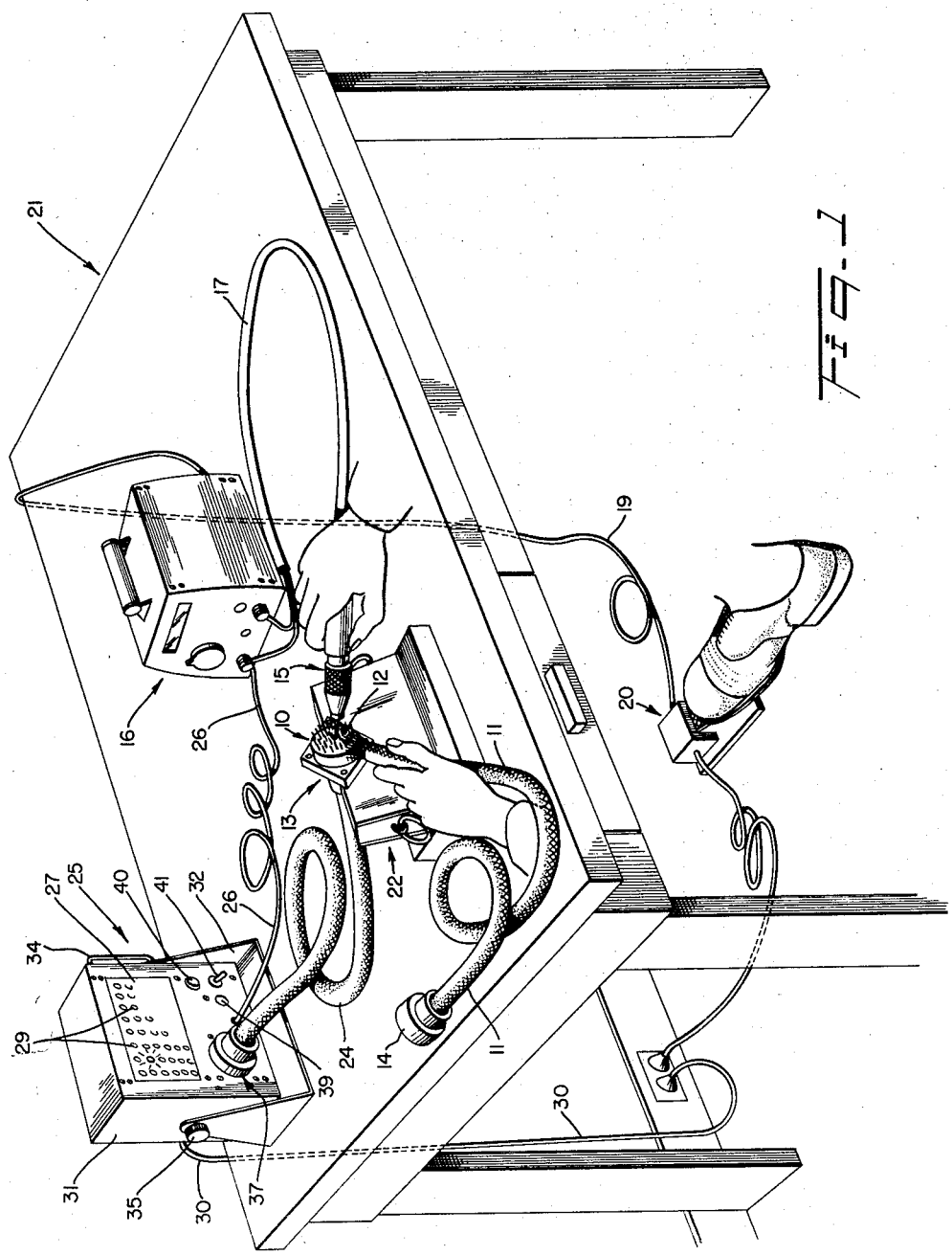
Fig. 1 is a somewhat schematic view in perspective of a combination of a contact-identifying device made in accordance with the invention with a soldering tool, the figure depicting the attachment of the wires at one end of a multi-wire cable to the solder wells of a connector part.
Figure 2:
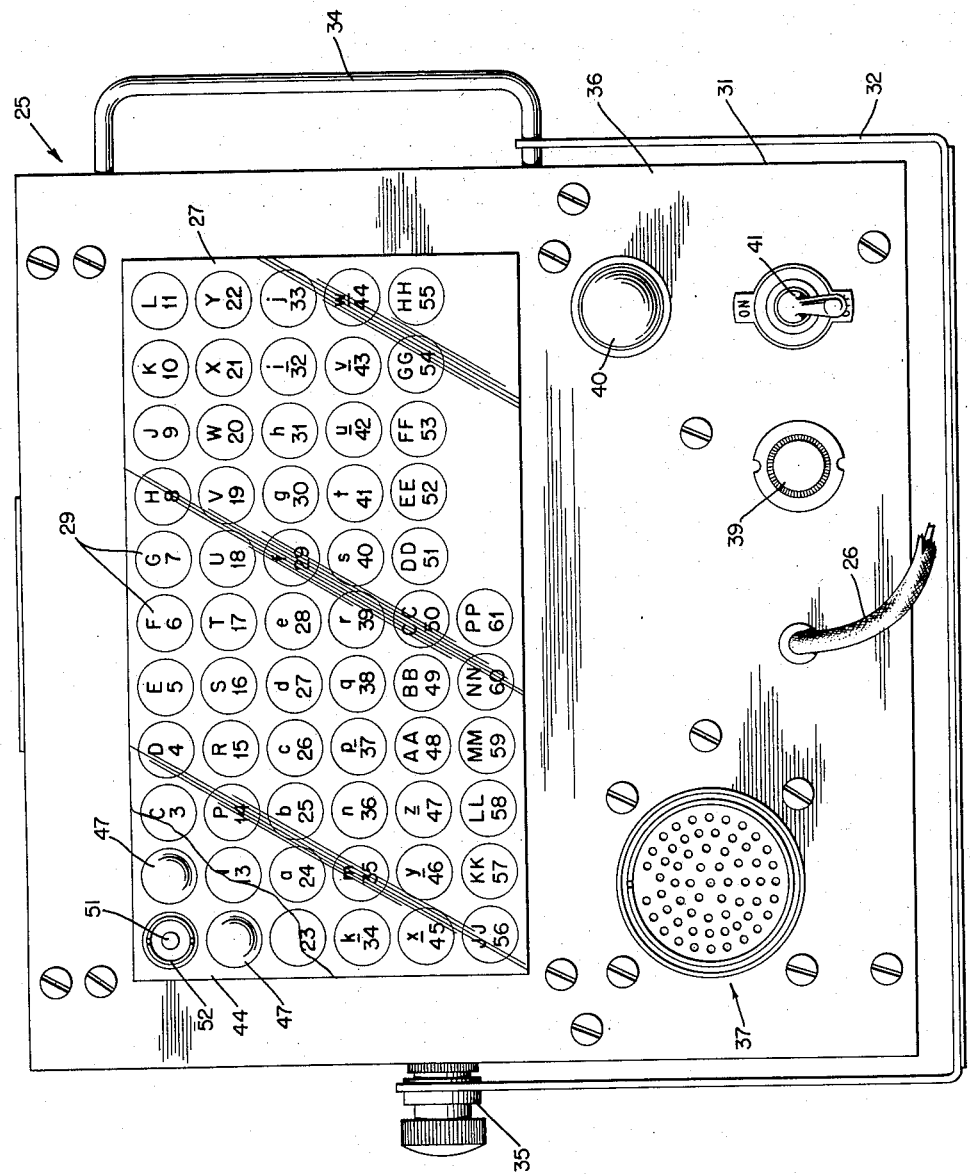
Fig. 2 is a view in front elevation of the identifier unit of the contact-identifying device.

Turning now to the drawings, the apparatus of a preferred embodiment of the invention is shown in Fig. 1, being used for the connection of wires 12 of a multi-wire cable 11 to the solder wells of a connector part 10. Connector part 10 is mounted in a suitable fixture 13 which both holds the connector part and provides for the electrical connection to each of its contacts. Cable 11 is shown as having a connector part 14 already mounted upon its other end.

Soldering of the wires 12 to the respective solder wells of connector part 10 is effected by a soldering tool or iron 15 which is supplied with heating current from a transformer 16 through a supply cable 17. Transformer 16 is supplied with current from a suitable outlet as shown, there being a foot switch 20 interposed in the supply cable 19 of the transformer.

Fixture 13 is supported in a mounting device 22 placed in a convenient position. A multi-wire cable 24 extends from fixture 13 to identifier unit 25. Cable 24 provides for the electrical connection of each of the contacts of connector part 10 to the circuit of the identifier unit. A probe wire 26 connected to the circuit of the identifier unit extends therefrom and is connected to the operative tip of soldering tool 15 in such manner that the latter functions as a probe. In the embodiments shown in Figs. 1 to 5, inclusive, the operative tip of soldering tool 15 is connected to one side of the supply circuit for the tool, and wire 26 from unit 25 is connected to the operative tip of tool 15 at one terminal of transformer 16.

Unit 25 has an at least translucent panel 27 having a plurality of regularly spaced indicia 29 thereon which are located in such manner as to have a predetermined easily recognized relationship to the location of the solder wells on connector part 10. Unit 25 has an individual light source mounted behind each of the indicia 29 and adapted to be illuminated upon completion of the circuit thereto by contact between the probe and the respective solder well of the connector part. Current for such light sources is supplied to unit 25 through a cable 30.

Unit 25 has a housing 31 which is supported between the opposed upstanding legs of a U-shaped bracket member 32. Casing 31 is pivotally connected to the legs of the bracket, the lower end of a handle 34 on housing 31 extending through an opening in the upper end of one of the legs of bracket 32, a stud secured to the other end of housing 31 extending through an opening in the upper end of the other leg of the bracket. Housing 31 is held at the desired angle with respect to the bracket by a thumb nut 35 screwed on to the outer end of the stud.

Housing 31 has a front panel 36 upon which the above described indicating panel 27 is mounted. Supported on panel 36 are the outlet 37 to which cable 24 is attached, a fuse 39, a pilot light 40, and a switch 41. The probe lead wire 26 also preferably extends through panel 36.

The mechanism interiorly of unit 25 and the circuit therefor are shown in Figs. 3 and 4, respectively. One side of the supply cable 30 has fuse 39 and switch 41 connected serially therewith, the supply cable being connected to the primary of a step-down transformer 42. The pilot light 40 is connected across the current supply to the primary of the transformer 42. One side of the secondary of transformer 42 is connected by a wire 46 to an electrically conducting metal plate 44 which is mounted at the rear of panel 31 in the upper portion thereof, plate 44 being secured to panel 31 by insulators 45 interposed between the plate and the panel. Mounted upon plate 41 is a plurality of signal lights 47 which are so arranged that one such light lies behind each of the indicia 29. Plate 44 has a hole therethrough at the location of each such light, a socket member having an outer sheath 52 extending through the hole and being secured to plate 44 by a rivet extending through a tab 53 on the sheath and the plate as shown. The center terminal 51 of the socket, insulated from sheath 52, is provided with a connector tab 50. Wires 49 extend from the rear of connector 37 to the respective center tabs 50 of the indicating lights. The probe lead wire 26 is connected, as shown in Fig. 4, to the other end of the secondary of transformer 42 and extends to the operative tip 54 of the soldering tool. In the embodiment shown, the heating resistance winding of soldering tool 55 is electrically connected at one end thereof to probe wire 26.

The manner of operation of the contact-identifying and soldering system shown in Figs. 1 to 4, inclusive, should be obvious from the above but will be briefly described. A suitable fixture 13 and cable 24 are chosen so as to receive the particular connector part 10 to be soldered and to make electrical connection with all of its contacts. Preferably unit 25, including connector 37, are so constructed as to provide for its use with connector parts having the maximum number of contacts. In some instances, therefore, some of the indicating lights and the circuits therefor will not be energized. In performing the operation depicted in Fig. 1, the operator holds the unconnected end of cable 11 in one hand and the soldering tool 15 in the other. He then proceeds, by touching the soldering tool to the various solder wells to find the correct solder well corresponding to a particular wire 12, and then solders the wire to the well. The particular indicating light 47 which is illuminated during such operation shows the operator whether or not he has selected the correct well; such visual signal persists throughout the soldering operation, during which time the operative tip of tool 15 remains in contact with the solder well. If at any time two or more indicating lights 47 are illuminated simultaneously, the operator is aware that a short circuit exists between the contacts and/or the wires.

In Fig. 5 there is shown a system useful in identifying the wires of a cable 64, one end of which has already been attached to a connector part 66. In Fig. 5 parts of the system which are similar to those of Figs. 1 to 4, inclusive, are designated by the same reference characters. In this embodiment an adaptor cable 56 having branches 57 and 59 is connected to connector 37 of unit 25. The various corresponding wires in branches 57 and 59 are connected together and to the respective wires in the branch of the cable leading to connector 37. The ends of branches 57 and 59 are provided with connector parts 60 and 67, respectively, which may, for example, have been mounted by use of the system of the invention as shown in Fig. 1. Cable 64 is shown as having a connector part 66 on one end thereof. A further connector part 61 having solder wells 62 thereon is mounted on connector part 60, and connector part 66 on cable 64 is connected to connector part 67.

The operator then presents soldering tool 15 to a particular solder well 62, and identifies or confirms the identification of the corresponding wire 65 in cable 64 by presenting tool 15 to it. The identifying wire is then soldered to the identified solder well. If during the identification of the solder well and of the wire, and during the soldering operation, two or more indicating lights of unit 25 should be illuminated, the operator will know that he has made an error in identification or soldering.

In Fig. 6 the identifier device of the invention is shown employed to test circuit continuity in a wiring harness. The tool 69 is, in this instance, simply a probe. The harness 70 tested is shown as having six branches, 71 to 76, inclusive, the ends of each branch being provided with a connector part similarly numbered 71′ to 76′, inclusive. Connector part 71′ is shown attached to fixture 13 at the end of adaptor cable 24. When a probe 69 is touched to the corresponding contact of each of connectors 71 to 76, inclusive, the same indicating light in unit 25 should be illuminated, assuming that the wires and contacts of the various cable branches and connector parts are connected in parallel. If at any time, upon touching a single contact with the probe, two or more indicator lights should be illuminated the operator will be warned of an error in the wiring of the harness. The system may, of course, also be employed to advantage in testing circuit continuity in harnesses and the like in which the wires in some of the branches are not connected to the wires in others of the branches.

Although only a limited number of embodiments of the invention have been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. Apparatus for identifying and permanently connecting each of a plurality of similar closely associated conductors to each of a number of wires, comprising a plurality of test circuits each including a distinctive electrically operated signal device connected in series therein, one of each of such test circuits being connected in series with its respective conductor, a source of electric current connected in series with each conductor, and a tool adapted to be selectively presented to the conductors, said tool functioning permanently to connect the conductors to the respective wires, the operative tip of the tool being connected to the test circuits so as to function as a probe completing each of the test circuits upon engagement with the respective conductors.

2. Apparatus as claimed in claim 1, wherein the tool is electrically heated, and comprising a conductor connecting all of the test circuits in series with the operative tip of the tool.

3. Apparatus as claimed in claim 1, wherein the tool is electrically resistance heated, a source of heating current connected to the tool, one side of the heating current source being connected to the operative tip of the tool, and a conductor connecting all of the test circuits to said one side of the source of the heating current.

4. Apparatus for identifying each of a plurality of closely spaced exposed contacts on a multi-circuit component, comprising a fixture holding the component and making electrical connection with the respective contacts thereof, an identifier unit including a plurality of test circuits each including a distinctive electrically operated signal device connected in series therein, means connecting the fixture to the unit so that one of each of the test circuits is connected in series with its respective contact, a source of electric current connected in series with each contact, and a probe connected to the test circuits in the unit and adapted to be presented to the contacts so as selecively to complete each of the test circuits, the fixture being spaced from the identifier unit, and comprising a cable containing at least as many conductors as there are contacts to be identified, the cable being connected to the unit and to the fixture.

5. Apparatus as claimed in claim 4, comprising a soldering tool adapted to be selectively presented to the contacts, the operative tip of the tool being connected to the test circuits so as to function as a probe completing each of the test circuits upon engagement with the respective contacts.

6. Apparatus as claimed in claim 4, wherein the soldering tool is electrically heated, and comprising a conductor connecting all of the test circuits in series with the operative tip of the soldering tool.

7. Apparatus as claimed in claim 4, wherein the soldering tool is electrically resistance heated, a source of heating current connected to the tool, one side of the heating current source being connected to the operative tip of the tool, and a conductor connecting all of the test circuits to said one side of the source of the heating current.

8. Apparatus for identifying each of a plurality of closely spaced exposed contacts on a multi-circuit component, and for identifying each of a plurality of wires to be connected to the respective contacts thereof, comprising a first multi-conductor means making electrical connection to the respective contacts of the component, an identifier unit including a plurality of test circuits each including a distinctive electrically operated signal device connected in series therein, a second multi-conductor means making electrical connection with each of said wires at a first end of the wires, the respective conductors of the first and second multi-conductor means being connected to each other and to the respective test circuits of the identifier unit so that one of each of the test circuits is connected in series with its respective contact, a source of electric current connected in series with each contact, and a probe connected to the test circuits in the unit and adapted to be presented to the circuits and to the second ends of the wires so as selectively to complete each of the test circuits, the first and second multi-conductors being in the form of a branched cable, a first branch of the cable being connected to the unit, a second branch of the cable being connected to the first ends of the wires, and a third branch of the cable being connected to said multi-circuit component.

9. Apparatus as claimed in claim 8, comprising multi-circuit first connector parts attached to the first and second ends of the branches of the cable, and mating second connector parts on the unit and the first ends of the wires making electrical connection with the corresponding first connector parts.

10. Apparatus as claimed in claim 9, wherein the multi-circuit component is a connector part, and comprising a mating connector part attached to the end of the third branch of the cable.

References Cited in the file of this patent
UNITED STATES PATENTS

| | | |
|---|---|---|
| 1,738,710 | Jones | Dec. 10, 1929 |
| 2,244,576 | Schnebelen | June 3, 1941 |
| 2,360,170 | Smith | Oct. 10, 1944 |
| 2,768,428 | MacGregor et al. | Oct. 30, 1956 |